Figure 1:
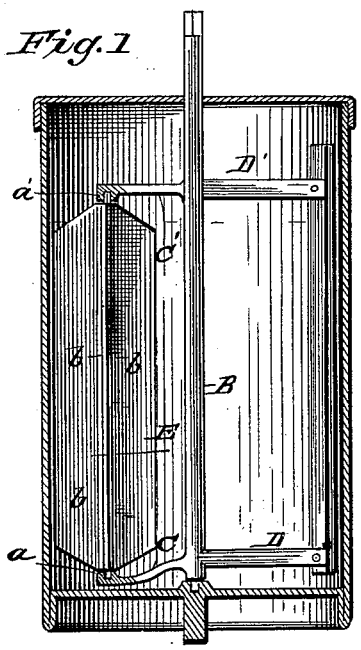

(No Model.)

H. C. CONDON.
ICE CREAM FREEZER.

No. 390,002. Patented Sept. 25, 1888.

WITNESSES:
Fred G. Dieterich
Edw. W. Byrn

INVENTOR:
H. C. Condon
BY Munn & Co.
ATTORNEYS.

UNITED STATES PATENT OFFICE.

HENSON C. CONDON, OF ROCHESTER, INDIANA, ASSIGNOR TO CHARLES G. SHEPARD AND WALTER J. SHEPARD, BOTH OF BUFFALO, NEW YORK.

ICE-CREAM FREEZER.

SPECIFICATION forming part of Letters Patent No. 390,002, dated September 25, 1888.

Application filed September 9, 1887. Serial No. 249,252. (No model.)

*To all whom it may concern:*

Be it known that I, HENSON C. CONDON, of Rochester, in the county of Fulton and State of Indiana, have invented a new and useful Improvement in Ice-Cream Freezers, of which the following is a specification.

My invention relates to ice-cream freezers, and its object is to stir and preserve a homogeneous consistency in the cream, so that all parts freeze alike, and to accomplish this with a construction which shall be simple, inexpensive, easily cleaned, and easily operated. It is well known that centrifugal action will separate cream and milk into two different qualities, the heavier and more watery particles going to the outer circumference, and the richer and lighter cream being displaced and going to the center, which principle has heretofore been made available in milk-skimming devices. It has been found that in ice-cream freezers the same principle exists to an objectionable extent, in that the more watery particles near the outer circumference will freeze first and leave the richer cream in the center. To obviate this dashers having a double motion or secondary rotation have been provided, which beat or stir the cream in opposite directions. A revolving main dasher has also been used, which carried a secondary revolving dasher on one side of it; but in all these cases the following objections exist: The parts are very complicated and difficult to clean, and an independent set of gears transmits motion to both the dashers, which makes the freezer turn so hard that toward the end of the operation it is almost impossible to turn it.

My invention provides for the thorough stirring and admixture of the cream, so as to preserve a smooth, uniform, and homogeneous richness and consistency in the product, and with a mechanical construction which is free from complication and as easily turned as the single-motion freezer.

It consists in a frame composed of a main revolving shaft with two horizontal arms, in which is pivoted about a vertical axis to one side of the main shaft a freely-revolving self-acting dasher or beater, which, instead of being rotated by the objectionable (positively-acting) gears, rotates simply from the different resistances which the paddles, wings, or blades on its opposite side find against the medium in which it revolves, said different resistances being due to the different distances which these blades are from the main shaft or primary center of rotation, combined with which, on the opposite side of the dasher-shaft, there is carried in radial arms a scraper, which scrapes off the congealing cream from the can and prevents it from interfering with the free motion of the dasher.

Figure 2:
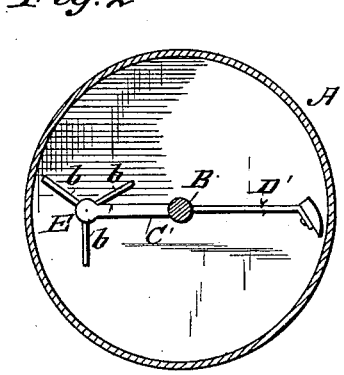
Figure 3:
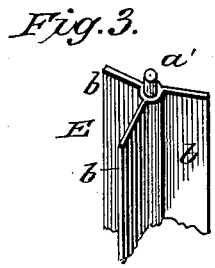

Figure 1 is a vertical section of a freezer having a dasher constructed in accordance with my invention, and Fig. 2 is a horizontal section taken just below the can-cover. Fig. 3 is a perspective view of one end of the dasher.

A represents the freezer can, which is constructed in the usual manner, with a centering lug on the outside of its bottom to fix it in the tub, and with a step-bearing on the inside of its bottom to receive the main revolving shaft. B is this main shaft, which is formed with two horizontal arms, C C', on one side, which carry my self-acting revolving dasher, and with two arms, D D', on the other side, that carry a scraper of any desired pattern.

E is the freely-revolving dasher, which is cast in one piece, of malleable iron, well tinned, and is composed of several vertical blades or wings, *b*, radiating from a common center and having a journal, *a*, at its lower end, which rests in the lower arm, C, and a journal, *a'*, at the top, which rests in the upper arm, C'. This freely-revolving dasher is arranged parallel, or nearly so, to the main axis of rotation, and has no mechanism for imparting a positive rotation to it, but acts freely in the following manner: It will be seen by reference to Fig. 2 that the blade of the dasher which is next to the can is much farther from the center of the can than the blades which stand to the interior, and as the main shaft B revolves with this dasher the blades on the outside of this dasher encounter a different leverage on the cream or resistance against the cream, due to different distances from the center, which different resistance or leverage constantly repeats itself to cause a secondary rotation of the dasher E, which thus acts freely in an automatic manner to stir the cream and preserve its uniformity and homogeneousness without involving the expense of greater power and complication of machinery.

With this freezer the work is not only accomplished more quickly and with an expenditure of less power, but it is not necessary to stop and take out the dasher and revolve the can to harden the cream, as is necessary with most freezers which use the double gearing and run hard. The construction of the revolving dasher is such, also, that after the work is done their vertical blades slip nicely out of the cream and clean themselves as they come out.

I am aware that it is not new in churns to provide a dasher that revolves freely upon an axis parallel with the main shaft. In ice-cream freezers, however, the scraper upon the opposite side of the dasher is an essential feature, since it performs the very important function of scraping off from the can the first film of congelation, which would soon interfere with and prevent the free rotation of the dasher. I therefore only claim the freely-revolving dasher when combined with the scraper, the supporting-shaft, and the can of an ice-cream freezer.

Having thus described my invention, what I claim as new is—

An ice-cream freezer consisting of a can, and a shaft having radial arms upon its opposite sides, bearing in one set of radial arms a freely-revolving dasher pivoted on an axis parallel with the shaft, and bearing in the other set of arms a scraper, all combined substantially as and for the purpose described.

HENSON C. CONDON.

Witnesses:
EMANUEL R. REED,
MILTON O. REES.